Jan. 15, 1946.  H. L. NEWELL  2,393,182
ELECTRIC HEATER
Filed May 29, 1944
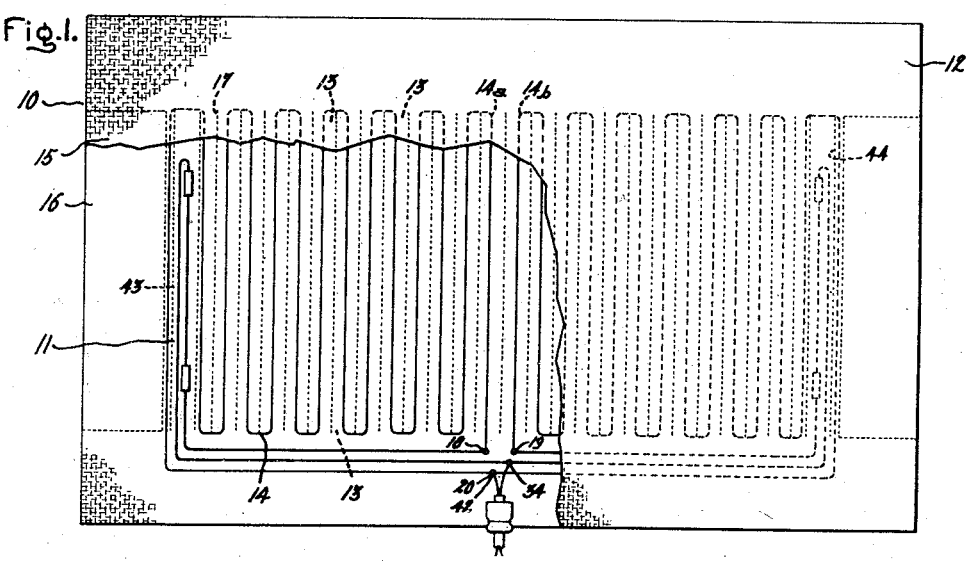
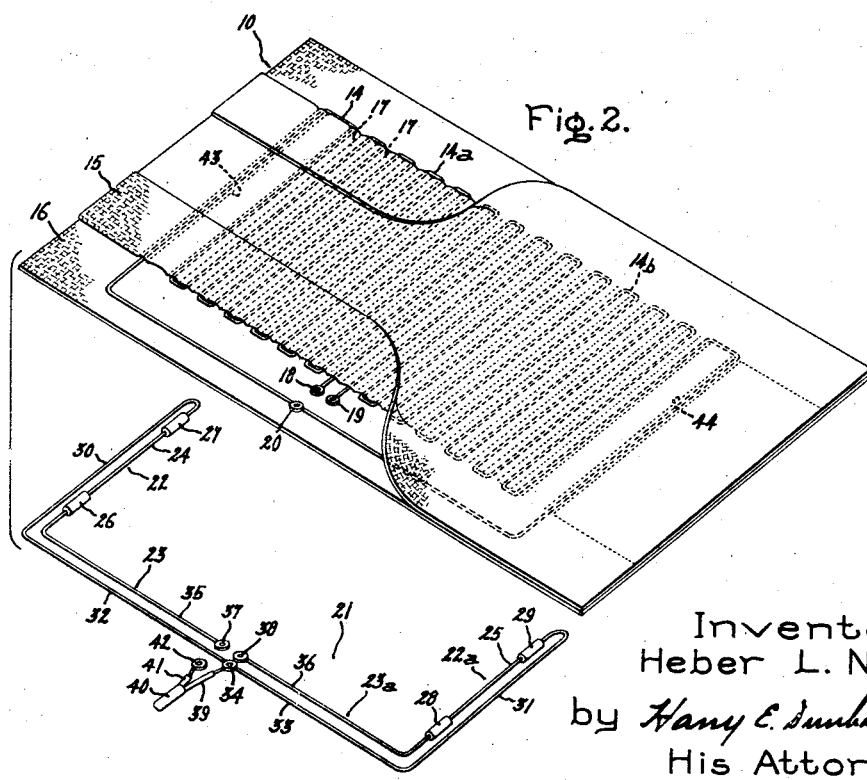
Inventor:
Heber L. Newell,
by Harry E. Dunham
His Attorney.

Patented Jan. 15, 1946

2,393,182

UNITED STATES PATENT OFFICE 2,393,182

ELECTRIC HEATER

Heber L. Newell, Bridgeport, Conn., assignor to General Electric Company, a corporation of New York Application May 29, 1944, Serial No. 537,801

5 Claims. (Cl. 219—46)

This invention relates to electrically heated devices, more particularly to such electrically heated devices as electric blankets, electric heating pads and the like which have one or more heating elements, each element comprising a relatively long length of heating wire and one or more thermostats connected therein, and it has for its object an improved heater of this character.

In heating devices of this character, it has been common practice heretofore to make up each heating element—prior to its assembly with the heating device—by connecting the thermostats in proper circuit relation with a heating wire, and at such points as will cause the thermostats to be located at the correct positions in the device after the heating element is assembled therein.

It is difficult to handle such heating elements, particularly where they have a relatively long length such as are required in electric blankets. This is especially true where the blanket has channels formed therein for receiving the heating element, because here the heating wire with the thermostats connected in it must be threaded back and forth through the channels into a number of convolutions. And here also, the threading operation is likely to impose detrimental stresses in the connections between the wire and the thermostats.

Moreover, in electrically heated devices where the heating element in any case is enclosed within the heated body of the device, it is very difficult to repair the heating element after it has been once assembled, since the body must be taken apart to gain access to the element, or in the case of the channel construction the heating element must be pulled out from the channels.

And since experience has shown that the main causes of failures of such heating devices are due to improper connections between the thermostats and the heating wire and to failures of the thermostats themselves it is desirable that such heating devices be constructed and arranged so as to reduce to a minimum the number of wire connections that have to be made in assembling the heating element; and moreover, that it be possible readily to remove the thermostats from the device independently of the heating wire.

It is an object of this invention to obtain these desired results.

In accordance with this invention, the heating wire is a separate continuous wire, and the thermostat is connected into a separate control circuit which may be readily inserted in and removed from the heating device independently of the heating wire. The thermostat is so connected that when the thermostat circuit is inserted, the thermostat is properly located in the heating device. Moreover, after being inserted in the device, the thermostat circuit can be readily connected with the heating wire so that the thermostat is properly connected with the heating wire.

In one specific application of this invention to an electrically heated blanket, the blanket is provided with a cavity in the heated body thereof in which at least a portion of the thermostat circuit is insertable. This portion includes the thermostat so that when it is inserted the thermostat is brought into proper relation to the body. Moreover, the heating wire and the thermostat circuit are provided with sets of terminals which are brought into close relation when the thermostat circuit is inserted in its cavity so that they can readily be joined together after the thermostat circuit has been inserted. The terminals are arranged so that when they are interconnected the thermostat will be properly connected with the heating wire—for example in series with it.

For a more complete understanding of this invention, reference should be had to the accompanying drawing in which Fig. 1 is a plan view of an electrically heated blanket embodying this invention, a part being broken away so as to illustrate certain details of construction; and Fig. 2 is a perspective expanded view of the blanket of Fig. 1 illustrating a certain element removed from the blanket and the relationship it has with other elements of the blanket.

Referring to the drawing, this invention has been shown in one form as applied to an electrically heated blanket comprising a flexible blanket body 10. The blanket body 10 is provided with a central area 11 which is heated, and with a marginal unheated area 12 completely surrounding the heated area 11, as shown.

The heated section 11 is provided with a series of substantially parallel channels 13 which receive a heat generating wire 14. This wire when threaded through the channels 13 is formed into a series of convolutions extending substantially throughout the entire area of the central heated section 11. As shown the end turns of the convolutions lie within the margins at the two sides of the blanket outside of the channels. The channels 13 extend cross-wise of the blanket, and hence, the convolutions extend crosswise thereof.

It will be understood that the blanket body 10 may be formed in any suitable way. Preferably, however, it is formed of top and bottom sheets 15 and 16 which are suitably joined together at spaced intervals indicated by the dotted lines 17 in order to form the channels 13, the outside edges of the sheets being left separate so as to form the marginal section 16. If desired, the top and bottom sheets may be sewed together along the line 17; or the channels may be formed at the time the blanket is woven, as described in the United States patent to Moberg No. 2,203,918, dated June 11, 1940.

As shown, the heating wire 14 is divided into two heating sections 14a and 14b which substantially cover the respective halves of the heated section 11, as clearly shown in the drawing. The inner ends of these two heating sections 14a and 14b end in terminals 18 and 19 respectively, while the outer ends of the two heater sections are joined together by a common terminal 20. The terminals 18, 19 and 20 are located outside of the channels, and about at the center of the blanket adjacent one edge thereof, as shown.

The heating element 14 is provided with a separate thermostat circuit 21, as shown more clearly in Fig. 2. This circuit comprises a conducting wire formed into two substantially L-shaped loops having corresponding arms 22 and 22a, and corresponding arms 23 and 23a. The inner wires 24 and 25 of the two arms 22 and 22a have connected therein pairs of thermostats 26 and 27, and 28 and 29, respectively. It will be understood that these thermostats may have any suitable construction, and will be provided with suitable terminals (not shown) for connection with the conducting wires of the loops. The outer corresponding wires 30 and 31 of the two arms 22 and 22a respectively are in substantially parallel relation with the two wires 24 and 25, and they terminate in transverse wire sections 32 and 33 which form the outer wires of the other two arms 23 and 23a of the thermostat circuit. These two sections 32 and 33 are electrically and mechanically interconnected by means of a terminal 34. The inner wires 35 and 36 of the two arms 23 and 23a respectively—parallel to wires 32 and 33— terminate in end terminals 37 and 38.

Connected with the terminal 34 is one conductor 39 of a twin supply conductor 40. The other conductor 41 of this twin supply conductor terminates in a terminal 42.

The blanket body 10 is further provided with a pair of special channels 43 and 44 positioned adjacent the two ends of the blanket and in substantially parallel relation with the channels 13 that receive the heating wire. These two channels 43 and 44 are adapted to receive the two opposed arms 22 and 22a of the thermostat circuit, and when these two arms are inserted within these channels, the other two arms 23 and 23a of the thermostat circuit lie between the upper and lower unconnected sheets 15 and 16 in the margin of the blanket on the side of the blanket which has the heater wire terminals 18, 19 and 20, all of which also are located in the margin between the two unattached blanket sheets. Thus, the thermostat circuit is laterally insertable into the blanket, and when so inserted the thermostat circuit terminals 34, 37, 38 and 42 are brought contiguous to the contacts 18, 19 and 20 of the heater wire.

After the thermostat circuit has been assembled with the blanket, the terminal 18 will be connected with the terminal 37, the terminal 19 will be connected with the terminal 38 and the terminal 20 will be connected with the terminal 42 of the supply cord. These connections may be made in any suitable way, as by soldering or brazing, or by means of screw terminal members (not shown). This connects the two thermostats 26 and 27 in series with the half heater section 14a, and the two thermostats 28 and 29 in series with the half heater section 14b.

After the thermostat circuit has been assembled, the two separate marginal sheets may be sewn together at the edges or may be sewn and provided with a suitable binding.

If it be desired to repair one of the thermostats or to repair a connection between any of the thermostats and their conducting wires it is merely necessary to open the blanket at its marginal outer edge so as to expose the two sets of terminals 18, 19 and 20, and 34, 37, 38 and 42; these may then be disconnected and the thermostat circuit removed in order to make the necessary repairs. Obviously, all of this can be done without disturbing the heating wires. In some cases, the section of the marginal seam opposite the terminals is left open, say for a length of six or eight inches, so that the connections and disconnections can be made conveniently.

Another advantage of this blanket construction is that it is only necessary to handle the heating wire itself in threading it into the blanket channels, rather than to handle the heating wire with thermostats already connected in it, as in the practice heretofore used.

The thermostatic circuit in the specific embodiment of the invention illustrated in the drawing is a protective circuit in that the thermostats are placed to prevent temperature rise in various portions of the blanket above a predetermined safe value.

It will be understood that while the heating wire 14 has been shown as formed into convolutions extending crosswise of the blanket, they may be and in many cases preferably should be laid lengthwise of the blanket. In such case, the heater sections 14a and 14b will be located on opposite sides of the longitudinal center line of the blanket; and here it is preferable that the control circuit channels 43 and 44 are located third or fourth from the sides so that there is no danger of their being tucked in at the sides. It will also be understood that here it is preferable to locate the terminals 18, 19 and 20 at the middle of the bottom of the blanket.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electrically heated blanket and the like comprising a body formed with a channeled heating section having therein a first channel for a heating wire and a separate second channel for a protective circuit, and said body also having a marginal area at the ends of said channels, a continuous heating wire located in said first channel and having electric supply terminal means connected therewith and located outside in said marginal area, and a protective circuit for said blanket separate from said conducting wire comprising a temperature responsive element and an electrical conducting wire connected with it and said conducting wire being insertable into said second channel from said marginal area and when inserted therein positioning said temperature responsive element in said channel and in proper thermal relation with said channeled heating section, and said electrical conducting wire also having a portion outside of said channeled section and located in said marginal area, terminal means connected to said portion for connection with said first-named terminal means, and means for electrically interconnecting said terminal means so that said temperature responsive element is connected in predetermined circuit relation with said heating wire.

2. An electrically heated blanket and the like having a flexible body formed with a series of substantially parallel channels therein, a heating wire threaded in said channels so as to be distributed in a series of convolutions through a major portion of the area of said body, and having a set of terminals located outside of said channels adjacent one edge of said body, a separate thermostat circuit having a thermostat and a conducting wire, said blanket having a separate channel substantially parallel to the others, said thermostat circuit having a portion thereof adapted to be inserted into said separate channel and when inserted locating the thermostat therein in proper relation with said body, and said circuit further having terminals located outside of said channels and adjacent said first-named set of terminals when said thermostat is inserted so that said sets of terminals may be readily joined, and the thermostat circuit being such that when said terminals are joined said thermostat is connected in series relation with said heating wire.

3. An electrically heated blanket and the like having a flexible body formed with a series of substantially parallel channels therein, a heating wire threaded in said channel so as to be distributed in a series of convolutions through a major portion of the area of said body, and having a set of terminals located outside of said channels adjacent the center of said body at an edge thereof, said body having a thermostat channel adjacent one end thereof, a control circuit for said wire including a thermostat and a conducting wire formed into an L-shaped loop, one arm thereof including said thermostat being inserted into said thermostat channel and the other arm of said loop extending from said channel along said edge of said body substantially to the center thereof where said terminals are located, and said control circuit further having a set of terminals located adjacent said first-named set when said control circuit is assembled with said body whereby they may be readily connected to them.

4. An electric blanket and the like comprising a blanket provided with a series of substantially parallel channels therein and having a marginal portion formed by separate opposed sheets and located at the ends of said channels at one edge of the blanket body, a heating wire threaded through said channels, said wire being provided with a set of terminals located within said marginal portion between said sheets, said body also having a separate thermostat channel having one end opening into said marginal portion, a thermostat circuit for said wire including a conducting wire formed into a loop insertable into said thermostat channel and having connected therein a thermostat, said thermostat circuit also including a conducting wire section located within said marginal portion between said sheets and having a set of terminals brought into contiguous relation with said first-named set when said control circuit is assembled with said body, and which when connected with said first named set connects said thermostat in series circuit relation with said heating wire.

5. An electrically heated blanket and the like comprising a body having formed therein a channeled heating section, said section having a channel for receiving a heating wire and a separate channel for receiving a protective circuit, and said body also having a marginal area into which said channels open, a continuous heating wire inserted in the heating wire channel and having a pair of terminals, and a separate protective circuit assembly comprising a temperature responsive element and a length of conducting wire having said temperature responsive element connected therein and said wire being formed into a loop insertable into said protective circuit channel and when inserted therein positioning said temperature responsive element in proper thermal relation with said channeled heating section, and said wire further having a pair of terminals which are positioned in said marginal area adjacent said first-named terminals when said loop is inserted in said protective circuit channel, and said assembly also having a twin supply conductor, and means electrically connecting one conductor thereof with one side of said loop, and means electrically connecting the other side of said loop with one terminal of said heating wire and the other conductor of said supply conductor with the other terminal of said heating wire, whereby said temperature responsive element is connected in series circuit relation with said heating wire.

HEBER L. NEWELL.